United States Patent Office 3,565,617
Patented Feb. 23, 1971

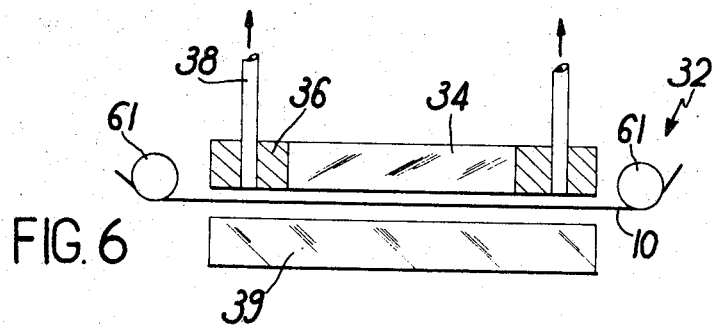
FIG. 6
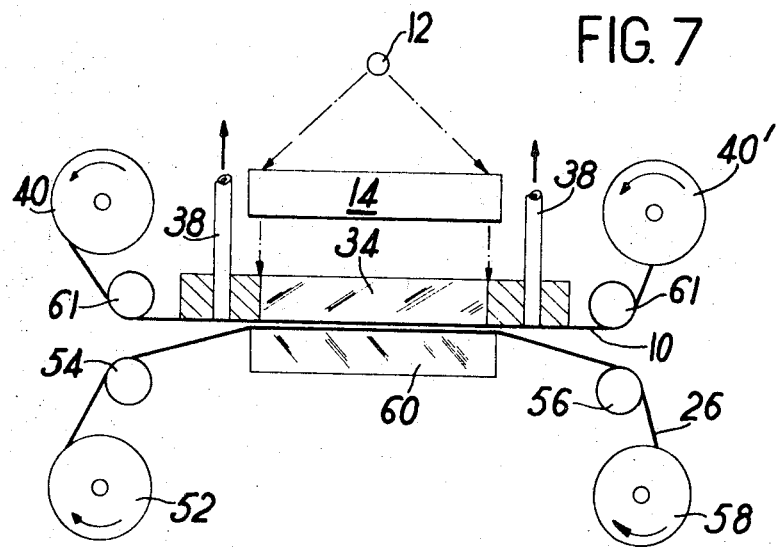
FIG. 7
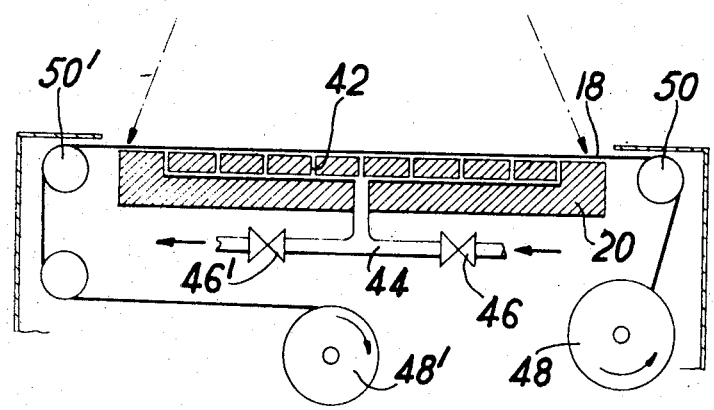

3,565,617
METHOD OF REMOVING UNWANTED LINES FROM A MASTER NEGATIVE TRANSPARENCY
Jean Jacques Beauval, Saint-Denis, and Guy Lechauguette, Gif-sur-Yvette, France, assignors to Commissariat a l'Energie Atomique, Paris, France
Filed Mar. 16, 1967, Ser. No. 623,769
Claims priority, application France, Mar. 17, 1966, 53,942
Int. Cl. G03c 5/04
U.S. Cl. 96—27                              6 Claims

ABSTRACT OF THE DISCLOSURE

For photographically copying negatives exhibiting dark tracks on a transparent background while removing a major portion of the tracks an image of the negative is projected on a white paper sheet; the tracks to be kept are darkened on the sheet; a fresh film is located in close contact with the negative and exposed to light transmitted through the negative and to light reflected by the undarkened portions of the paper sheet.

---

The invention relates to a method and apparatus for photographic copying and is intended to provide a method which enables to obtain from a master negative displaying dark lines on a transparent background, a copy image on which part only of said lines appears.

The invention is of particular use for obtaining copies of photographic pictures taken with cameras associated with bubble chambers or other devices and showing the tracks of particles intervening in nuclear interactions. Such pictures display, in addition to identification markings, numerous particles tracks (20 tracks for instance) among which 3 or 4 only are of interest. The recently developed automatic track following and analyzing methods are much more easily carried out if the useless tracks are first removed from the picture.

It is a primary purpose of the invention to provide a method and apparatus which are relatively simple and enable to obtain, from a master negative, a copy print which exhibits only the lines or tracks of interest i.e. on which the useless lines or tracks are omitted.

For this purpose, the invention provides a method comprising the successive steps of projecting an enlarged image of said negative onto a blank surface; darkening said surface over the images those portions of the lines which are to appear on the copy; placing a photosensitive medium of the type suitable to be exposed to light directed toward either side into contact with the negative, between said negative and blank surface; simultaneously or successively exposing said photosensitive medium to light projected through said negative and to light reflected by or transmitted through said surface whereby the whole surface of said photosensitive medium except along said lines which are to appear on the copy is exposed to light; and developing the exposed photosensitive medium for obtaining said copy.

The invention will now be described by way of example with reference to the accompanying drawings wherein.

Figure 1:
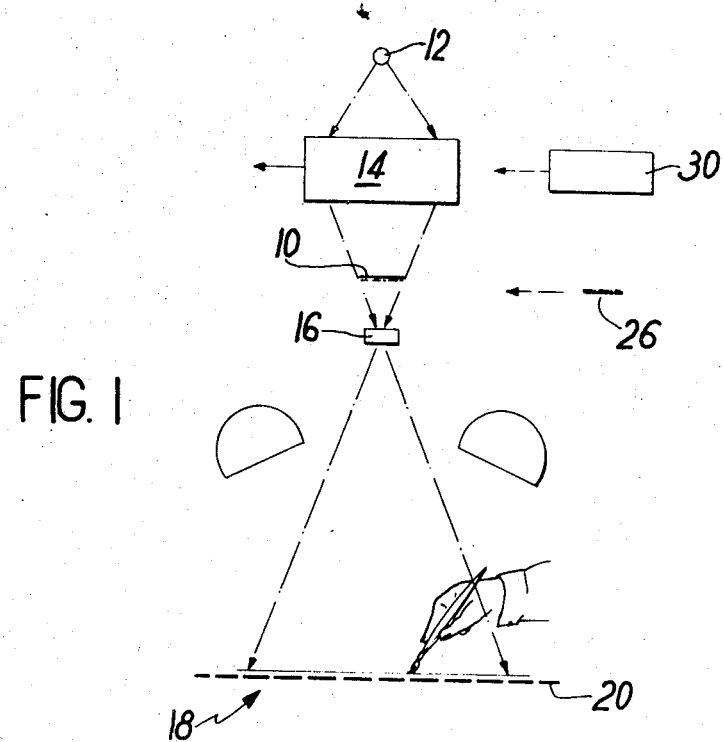
FIGS. 1 and 2 illustrate schematically two successive steps of the process according to the invention.
Figure 2:
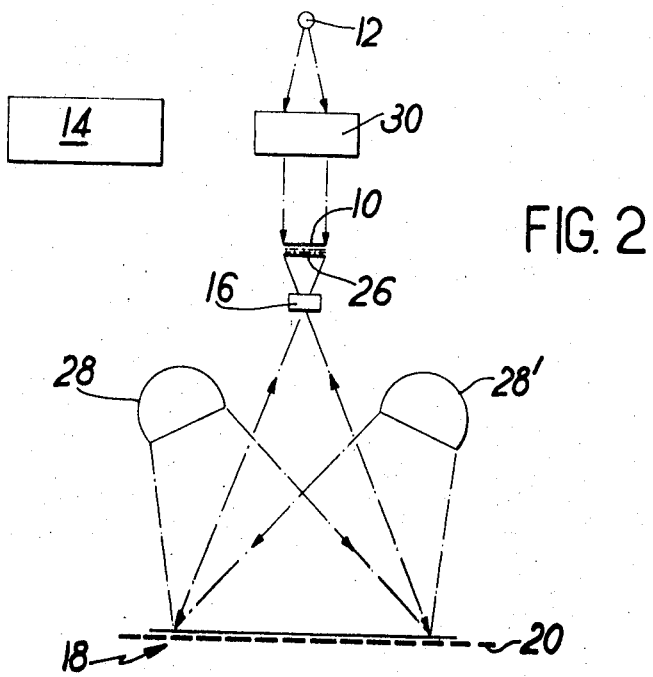

FIG. 6 indicates most schematically a film holder for temporarily locking the master negative with respect to the blank surface;

FIG. 7 is a schematic view illustrating a film holder, for retaining the negative and copy film, and a blank surface.

The process according to the invention will now be described with reference to FIGS. 1 to 5. As a first step, the master negative 10 is located and locked on a film holder carried by a frame (not shown) and adapted to avoid minute movements of the negative, due for instance to vibrations, with respect to the frame. The negative exhibits a plurality of tracks in the form of dark lines on a light transparent background and identification markings. The negative is placed with the gelatine layer containing the nuclear emulsion on its underside. An optical system comprising a light source 12, a condenser 14 and a projection lens 16 is used for projecting an enlarged image of the negative 10 on a blank surface 18. This surface consists for instance in a sheet of white nonglossy paper locked on a holder 20 which provides sufficient accuracy and rigidity. An image of the tracks appears on the sheet as black lines on a white background.

Figure 3:
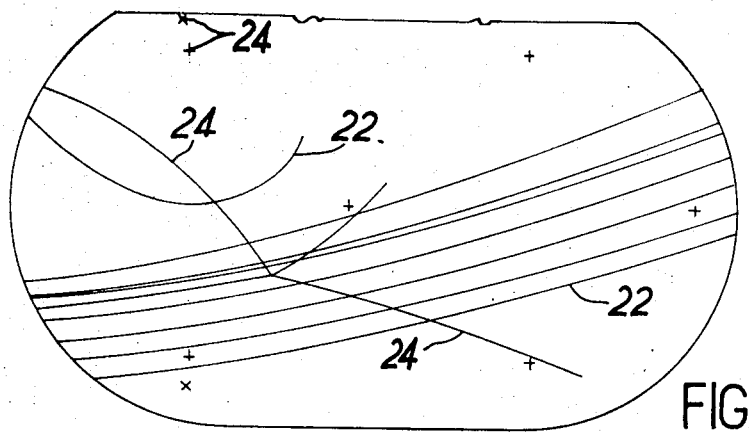
FIG. 3 shows schematically the projection of a master negative on the blank surface, consisting in a photographic picture of events occurring in a bubble chamber.

Referring to FIG. 3, there is shown the image of the tracks of a typical negative, consisting in a dozen of parallel useless beam tracks such as 22 and a less number of tracks 24 corresponding to nuclear events to be analyzed.

An operator then manually darkens the paper sheet along the images of the tracks to be reproduced, while avoiding to darken at the same time those tracks which should be removed. This is made using for instance a brush and dark ink.

Since it is necessary to remove the useless tracks completely and it is obviously preferable to remove a fraction as small as possible of the useful tracks, some precautionary measures should be taken: The darkened portions should overlap the useful tracks and identification markings for avoiding disappearance thereof on the copy due to unavoidable relative movements of the negative and of the blank surface 18 during the exposure of the copy film; the darkened portions should end at such a distance of the tracks to be suppressed that there is no risk of reproducing them.

Figure 4:
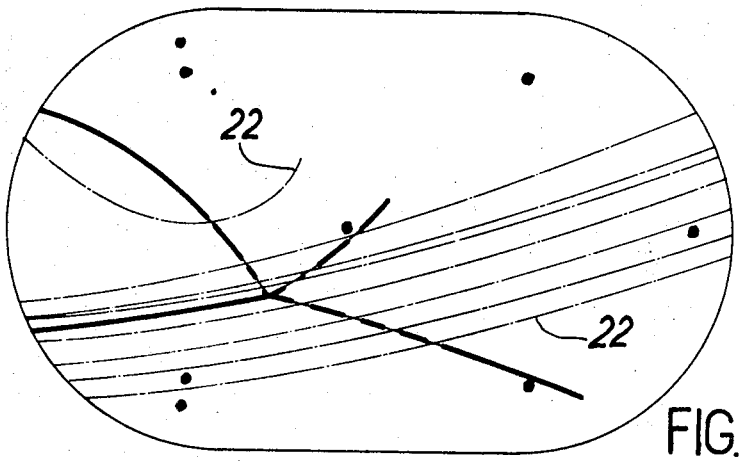
FIG. 4 shows schematically the blackened lines manually drawn on the working surface (the tracks to be omitted on the copy being illustrated in dash-dot lines in order to permit a comparison between FIG. 4 and FIG. 3)

FIG. 4 illustrates the sketch which results from the work done by the operator on the paper sheet constituting the blank surface 18. On that figure the tracks to be removed have been illustrated in dash-dot lines for permitting of comparison with FIG. 3. After the lamp 10 has been switched off the paper sheet exhibits only those manuscript lines which will be referred to as a whole in the following specification as the "array."

A photosensitive medium, generally a copy film 26, is then placed under the negative and in intimate contact therewith, as shown in FIG. 1. The fresh copy film is placed with its gelatine coating upward in direct contact with the gelatine coating of the negative. That copy film 26, which will provide the copy image, should be without anti-halation layer, so that it is possible to expose it through its support layer (flexible plastic for instance). The copy film 26 is then subjected to two exposures, simultaneously or successively.

(a) Condenser 14 is replaced with another condenser 30 of longer focal length and the lamp 12 is switched on for providing a parallel light beam which attain that portion of the copying film 26 which is not masked by the tracks on the negative 10.

(b) Lamps 28 and 28' are switched on for providing a powerful and steady illumination of the blank surface 18.

The light reflected from said blank surface acts upon those portions of the copy film 26 which do not correspond to the "array" drawn on the blank surface.

Figure 5:
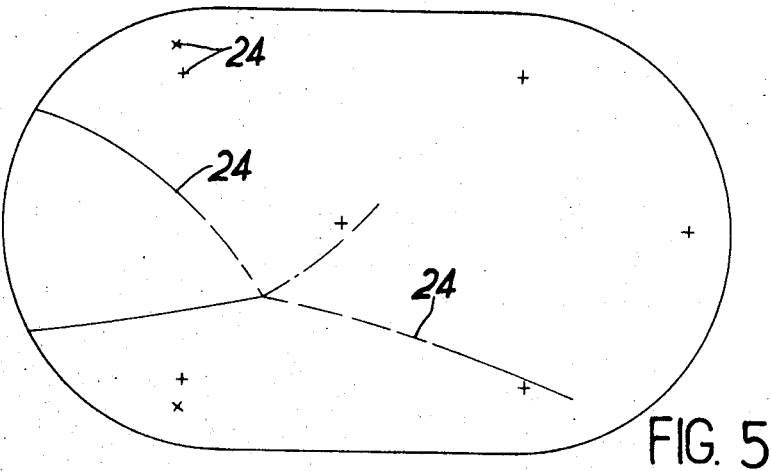
FIG. 5 shows the tracks appearing on the copy, the tracks being light lines on a dark background.

As a result, the latent image on the copy film, due to the surimpression of the images received through the negative 10 and from the blank surface 18 covers the complete surface of that film but those portions of the tracks which correspond to the "array." When the copy film has been developed, it provides a copy image exactly opposite of that illustrated on FIG. 5, that is an image consisting in white or transparent lines reproducing the greater portion of the useful tracks on a black background. Of course this result is attained only if the relative positions of the negative 10, working surface 18 and copy film 26 have not been modified during the whole time length of the process.

It would obviously be possible to start with a master transparency on which the tracks appear as transparent lines on a dark background; but it would then be necessary first to prepare a negative from that picture. The blank surface may also consist in a translucid plate (slightly frost glass sheet for instance): In that case lamps 28 and 28' are located under the plate.

FIGS. 6 and 7 schematically illustrate an apparatus for carrying out the process which has been described above. There is shown on FIG. 6 a film holder 32 for locking the negative, consisting in a portion of a film reel, during the projection of the image on the blank surface. The film holder comprises an upper plate having a transparent central portion 34 through which transmission of the light from the condenser system takes place and having a lateral frame 36 formed with nozzles 38 which open on the underside of the frame. The nozzles may be connected to a vacuum source. There is also provided a lower transparent plate 39 and a device (not shown) for moving the plates toward from each other and spreading them apart between a first relative position in which they are forced toward each other and squeeze the negative 10 and another position (illustrated on FIG. 6) in which they are clear of the negative 10.

The negatives to be copied constitute frames of a film which is stored on a reel 40 and is fed to a reel 40' (FIG. 7); movement of the film is controlled by a driving mechanism (not shown).

The blank surface consists in a strip of white paper stored on a feeding reel 48 and driven by a reel 48' on which the used paper is stored. Guiding cylinders 50 and 50' maintain the strip of paper under a tractive force and slightly above a table 20, for easier movement of the paper strip. A series of holes 32 are formed in the table and are connected to a line 44 which may be completed by manually controlled valves 46 and 46' either to a vacuum source or to a source of air under slight overpressure with respect to atmosphere.

The copy film 26 for providing the copy image is stored in a light trapped cassette where it is wound on a reel 58. The exposed film is wound on a reel 52 in a similar cassette provided with a mechanism for driving the film. Between the two cassettes the copy film is guided by rollers 54 and 56 and by a transparent plate 60 which may be substituted to plate 39. All parts of the device associated with the copy film may be laterally moved as a whole during the time duration where they are not necessary. When the copy film 26 is to be exposed, the assembly is brought to the position illustrated in FIG. 7 and the plates 34 and 60 are moved toward each other for squeezing the negative and copy film.

The operation of device of FIGS. 6 and 7 is obvious and will be only briefly described: First, a master negative 10 to be copied is selected on the developed film. During the selection lamp 12 is switched on, the plates 34 and 39 are spread apart and the film is slowly circulated between the plates. The operator examines the images projected on the white paper sheet. The negative film is guided by rollers 61. The film speed is preferably adjustable by the operator at a value between complete stop and 30 cm./sec. for easier examination of the negatives.

After a selected negative has been centered in the film holder 32, the plates 34 and 39 are moved toward each other and lock the negative. The plate actuating mechanism is preferably such that the plates contact in the plane where the film lies while it is circulated. The line 44 is connected to the vacuum source for firmly maintaining the paper strip 18 and the operator draws the "array" on the paper strip. After the "array" has been completed, the nozzles 38 are connected to a vacuum source for retaining the negative, the plate 39 is lowered and moved clear of the optical path.

Lamp 12 is switched off and plate 39 is substituted with the copy assembly comprising the copy film 26 and the associated parts. Plate 60 is lifted to press the copy film 26 against the negative 10 and condenser 14 is replaced with condenser 30. The lamp 12 is switched on again and acts on the copy film through the negative (the gelatine coatings of the films being in direct contact) for a time sufficient to provide a latent image in all portions of the copy film which are not masked by the tracks. The lamps 28 and 28' are similarly lighted for a time sufficient to provide a latent image in those portions of the copy film which do not correspond to the "array."

After the exposure has been completed, the lamps are switched off the copy film is moved forward, the copy assembly is removed and replaced with plate 39. The line 44 is disconnected from the vacuum source and fed with air under a light overpressure which lifts the paper of table 20 for easying movement of the paper strip which is displaced until a completely white surface is available under the projection lens. A new negative may then be selected.

From the foregoing description it should be apparent that the present invention solves the problem of eliminating the useless tracks in a simple way and without loss of precision: The deformations of the image during the copy may be rendered negligible by using a film having a "mylar" support and a fine grain emulsion (grain size smaller than the diameter of the images of the bubbles on the negative). The film 10 may easily be locked with a stability exceeding 0.01 mm.: if the projection enlargment is 10 fold, it suffices that the "array" overlaps the projected images of the tracks by 0.1 mm. at least: Such a condition is easily fulfilled since the thickness of the lines drawn by the operator's brush much exceeds this value. It should be further understood that modifications are possible without departing from the scope of the invention as defined by the appended claims.

We claim:
1. A method of photographically producing from a master negative displaying dark lines on a transparent background a copy on which portions only of said lines appear as light lines on a dark background, comprising the steps of:
projecting an enlarged image of said negative onto a blank surface;
darkening said blank surface over the images of those portions of the lines which are to appear on the copy;
placing a photosensitive medium suitable to be exposed to light directed toward either side thereof into contact with said negative, said photosensitive medium being located between said negative and blank surface;
exposing said photosensitive medium to light projected through said negative;
exposing said photosensitive medium to light reflected by or transmitted through the non-darkened part of said surface, whereby the whole surface of said photosensitive medium is exposed to light except in the zones which correspond both to said lines and to the darkened portions on the blank surface.

2. A method of photographically producing from a master negative, picturing particle tracks and nuclear events in a bubble chamber, a copy image on which certain only of said tracks appear, comprising the steps of:

projecting an enlarged image of said negative onto a blank surface;

darkening said blank surface only over the images of those tracks which are to appear on the copy;

placing a photosensitive medium suitable to be exposed to light directed toward either side thereof into contact with said negative, said photosensitive medium being located between said negative and blank surface;

exposing said photosensitive medium to light projected through said negative;

exposing said photosensitive medium to light reflected by or transmitted through the non-darkened part of said surface, whereby the whole surface of said photosensitive medium except along the tracks which are to appear on the copy is exposed to light;

and developing said medium.

3. A method according to claim 2, wherein said blank surface is darkened over those tracks which are to appear on the copy except where those tracks intersect tracks which are to be deleted from the copy.

4. A method according to claim 2, wherein said master negative is placed with its emulsion toward said surface and wherein said photosensitive medium is placed with its emulsion in close contact with said negative.

5. A method according to claim 2, wherein said blank surface is non-glossy, opaque and of light color and wherein said copying film is exposed to light directed toward and reflected by said surface.

6. A method according to claim 2, wherein said blank is the upper surface of horizontal translucid slab and wherein said photosensitive medium is exposed to light transmitted through said slab.

References Cited
UNITED STATES PATENTS 2,927,857   3/1960   Pohl _____ 96—2

GEORGE F. LESMES, Primary Examiner

U.S. Cl. X.R.

355—18